United States Patent
Olofsson

(10) Patent No.: US 11,282,546 B2
(45) Date of Patent: Mar. 22, 2022

(54) DYNAMIC LIP-SYNC COMPENSATION FOR TRULY WIRELESS BLUETOOTH DEVICES

(71) Applicant: Sony Corporation, Tokyo (JP)

(72) Inventor: Jerker Olofsson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/759,820

(22) PCT Filed: Feb. 27, 2019

(86) PCT No.: PCT/US2019/019769
§ 371 (c)(1),
(2) Date: Apr. 28, 2020

(87) PCT Pub. No.: WO2019/168931
PCT Pub. Date: Sep. 6, 2019

(65) Prior Publication Data
US 2020/0312374 A1    Oct. 1, 2020

(30) Foreign Application Priority Data

Mar. 1, 2018 (SE) .................................. 1830070-7

(51) Int. Cl.
*G11B 27/11* (2006.01)
*G06F 3/16* (2006.01)

(52) U.S. Cl.
CPC .............. *G11B 27/11* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 8,199,780 B2 * | 6/2012 | Gha | H04N 21/4307 370/517 |
| 9,338,391 B1 | 5/2016 | Greene et al. | |

(Continued)

FOREIGN PATENT DOCUMENTS

| | | |
|---|---|---|
| EP | 2063662 A2 | 5/2009 |
| EP | 3163887 A1 | 5/2017 |

(Continued)

OTHER PUBLICATIONS

International Search Report and Written Opinion from corresponding International Application No. PCT/US2019/019769, dated Apr. 24, 2019, 9 pages.

(Continued)

*Primary Examiner* — Gelek W Topgyal
(74) *Attorney, Agent, or Firm* — Tucker Ellis LLP

(57) ABSTRACT

Audio systems in which a primary audio device (28) communicates wirelessly with a second audio device (36) include a latency caused by the communication between the two audio devices. For example, a truly wireless audio device can comprise a first earpiece and a second earpiece. The electronic device (10) that is playing a media file transmits audio data to the first earpiece. The first earpiece then transmits a portion of the audio data to the second earpiece. This communication between the first and second earpiece causes a latency that the system can account for in order to synchronize a video playback with the corresponding audio playback on the wireless headset.

13 Claims, 5 Drawing Sheets

(56) References Cited

U.S. PATENT DOCUMENTS

| | | | |
|---|---|---|---|
| 9,400,632 B2* | 7/2016 | Beckhardt | G06F 3/165 |
| 2008/0242229 A1* | 10/2008 | Sharma | H04M 1/05 |
| | | | 455/41.3 |
| 2009/0091655 A1 | 4/2009 | Russell et al. | |
| 2009/0109894 A1* | 4/2009 | Ueda | H04M 1/6066 |
| | | | 370/315 |
| 2011/0142268 A1* | 6/2011 | Iwakuni | H04R 25/43 |
| | | | 381/312 |
| 2012/0155670 A1 | 6/2012 | Rutschman | |
| 2016/0330541 A1 | 11/2016 | Miao | |
| 2017/0048680 A1* | 2/2017 | Chuang | H04W 64/003 |
| 2017/0180844 A1 | 6/2017 | Nanni et al. | |
| 2017/0195769 A1 | 7/2017 | Chang et al. | |
| 2018/0167149 A1* | 6/2018 | Stilwell | H04W 4/80 |
| 2019/0215349 A1* | 7/2019 | Adams | A63F 13/285 |

FOREIGN PATENT DOCUMENTS

| | | | |
|---|---|---|---|
| WO | 2011031910 A1 | 3/2011 | |
| WO | 2014033570 A1 | 3/2014 | |

OTHER PUBLICATIONS

Notice(4 month) Office Action from corresponding International Application No. 1830070-7, dated Oct. 5, 2018, 11 pages.

* cited by examiner

DYNAMIC LIP-SYNC COMPENSATION FOR TRULY WIRELESS BLUETOOTH DEVICES

RELATED APPLICATION DATA

This application claims the benefit of Swedish Patent Application No. 1830070-7, filed Mar. 1, 2018, the disclosure of which is incorporated herein by reference in its entirety.

TECHNICAL FIELD OF THE INVENTION

The technology of the present disclosure relates generally to audio playback devices that wirelessly receive audio data from an electronic device.

BACKGROUND

Wireless headsets such as Bluetooth headsets are in widespread use. Wireless headsets often include two earpieces (one for each of the user's ears), in which the two earpieces also communicate wirelessly with each other. With these types of "truly wireless" headsets, a latency is introduced due to the wireless communication path between the two earpieces. The latency can create a noticeable lag between audio playback and a corresponding video playback on the electronic device. For example, during a video in which a person is speaking, a user might detect a noticeable delay between the audio of the person's speech and the movement of the person's lips. Therefore, there exists a need to compensate for such a lag.

SUMMARY

The disclosed approach involves detecting and compensating for latency caused by communication of audio data between a primary audio device and a second audio device. The primary audio device wirelessly receives a first portion of audio data and a second portion of audio data from the electronic device. The primary audio device wirelessly transmits the second portion of audio data to the second audio device. The second audio device sends an acknowledgement signal to the primary audio device once the second portion of audio data is received. Based on this acknowledgment signal, the primary audio device can calculate an audio delay time and synchronize the audio playback based on the audio delay time. Further, the primary audio device can wirelessly transmit the audio delay time to the electronic device. The electronic device is configured to delay a video playback based on the audio delay time in order to synchronize the video playback on the electronic device to the audio playback on the primary audio device and second audio device.

According to one aspect of the disclosure, a system for synchronizing audio-video playback comprises an electronic device, and a primary audio device. The primary audio device is configured to wirelessly receive, from the electronic device, a first portion of audio data for playback with the primary audio device, and a second portion of audio data for playback with a second audio device, wirelessly transmit the second portion of audio data to the second audio device, and wirelessly transmit an audio delay time to the electronic device. The audio delay time accounts for a latency caused by wirelessly transmitting the second portion of audio data from the primary audio device to the second audio device. The electronic device is configured to delay a video playback based on the audio delay time.

According to one embodiment of the system, the primary audio device is further configured to wirelessly receive an acknowledgment signal from the second audio device, wherein the acknowledgment signal acknowledges receipt of the second portion of audio data at the second audio device, and determine the audio delay time based on receiving the acknowledgment signal.

According to one embodiment of the system, the primary audio device uses Bluetooth communication to receive the first portion of audio data and the second portion of audio data from the electronic device, and to transmit the audio delay time to the electronic device.

According to one embodiment of the system, the primary audio device utilizes an Advanced Audio Distribution Profile (A2DP) or an Audio/Video Remote Control Profile (AVRCP) to transmit the audio delay time to the electronic device.

According to one embodiment of the system, the primary audio device is further configured to update the audio delay time and transmit the audio delay time to the electronic device based on receiving a subsequent acknowledgment signal from the second audio device.

According to one embodiment of the system, the primary audio device is further configured to determine a change in audio delay time between a currently determined audio delay time and a previous audio delay time, compare the change in audio delay time to a threshold, and transmit the currently determined audio delay time to the electronic device based on a determination that the absolute value of the change in audio delay time is greater than the threshold.

According to one aspect of the disclosure, a method for determining and transmitting an audio delay time comprises wirelessly receiving, from an electronic device, a first portion of audio data for playback with a primary audio device, and a second portion of audio data for playback with a second audio device, wirelessly transmitting the second portion of audio data to the second audio device, and wirelessly transmitting the audio delay time to the electronic device. The audio delay time accounts for a latency caused by wirelessly transmitting the second portion of audio data to the second audio device.

According to one embodiment of the method, the method further comprises wirelessly receiving an acknowledgment signal from the second audio device, wherein the acknowledgment signal acknowledges receipt of the second portion of audio data at the second audio device, and determining the audio delay time based on receiving the acknowledgment signal.

According to one embodiment of the method, the method further comprises determining that the second audio device did not receive the second portion of audio, and adjusting the audio delay time to account for audio playback by only the primary audio device.

According to one embodiment of the method, Bluetooth communication is used for wirelessly receiving the first portion of audio data and the second portion of audio data, and for wirelessly transmitting the audio delay time to the electronic device.

According to one embodiment of the method, the primary audio device utilizes an Advanced Audio Distribution Profile (A2DP) or an Audio/Video Remote Control Profile (AVRCP) to transmit the audio delay time to the electronic device.

According to one embodiment of the method, determining the audio time delay comprises determining a time difference between transmitting the second portion of audio and receiving the acknowledgment signal from the second audio device, and dividing the time difference by two.

According to one embodiment of the method, the method further comprises updating the audio delay time and wirelessly transmitting the updated audio delay time to the electronic device based on receiving a subsequent acknowledgment signal from the second audio device.

According to one embodiment of the method, the method further comprises determining a change in audio delay time between a currently determined audio delay time and a previous audio delay time, comparing the change in audio delay time to a threshold, and wirelessly transmitting the currently determined audio delay time to the electronic device based on a determination that the absolute value of the change in audio delay time is greater than the threshold.

According to one aspect of the disclosure, a method for synchronizing audio-video playback comprises wirelessly transmitting, to a primary audio device, a first portion of audio data for playback with the primary audio device, and a second portion of audio data for playback with a second audio device, wirelessly receiving, from the primary audio device, an audio delay time that accounts for a latency caused by the primary audio device transmitting the second portion of audio data to the second audio device, and delaying video playback based on the audio delay time.

According to one embodiment of the method, Bluetooth communication is used for wirelessly receiving the audio delay time from the primary audio device.

According to one embodiment of the method, wirelessly receiving the audio delay time from the primary audio device utilizes an Advanced Audio Distribution Profile (A2DP) or an Audio/Video Remote Control Profile (AVRCP).

According to one embodiment of the method, Bluetooth communication is used for wirelessly transmitting the first portion of audio data and the second portion of audio data.

According to one aspect of the disclosure, a method for synchronizing audio-video playback using a system comprising an electronic device and a primary audio device comprises wirelessly receiving, at the primary audio device, a first portion of audio data for playback with the primary audio device, and a second portion of audio data for playback with a second audio device, wirelessly transmitting the second portion of audio data from the primary audio device to the second audio device, wirelessly transmitting an audio delay time from the primary audio device to the electronic device, wherein the audio delay time accounts for a latency caused by wirelessly transmitting the second portion of audio data from the primary audio device to the second audio device, and delaying a video playback at the electronic device, based on the audio delay time.

According to one embodiment of the method, the method further comprises wirelessly receiving an acknowledgment signal at the primary audio device from the second audio device, the acknowledgment signal acknowledges receipt of the second portion of audio data at the second audio device, and determining the audio delay time, at the primary audio device, based on receiving the acknowledgment signal.

According to one embodiment of the method, the steps of wirelessly receiving the first portion of audio data and the second portion of audio data from the electronic device, and transmitting the audio delay time to the electronic device are performed using Bluetooth communication.

According to one embodiment of the method, the step of wirelessly transmitting the audio delay time to the electronic device utilizes an Advanced Audio Distribution Profile (A2DP) or an Audio/Video Remote Control Profile (AVRCP).

According to one embodiment of the method, the method further comprises wirelessly receiving a subsequent acknowledgment signal at the primary audio device from the second audio device, updating the audio delay time at the primary audio device, and wirelessly transmitting the updated audio delay time to the electronic device based on receiving the subsequent acknowledgment signal from the second audio device.

According to one embodiment of the method, the method further comprises determining, at the primary audio device, a change in audio delay time between a currently determined audio delay time and a previous audio delay time, comparing the change in audio delay time to a threshold, and wirelessly transmitting the currently determined audio delay time to the electronic device based on a determination that the absolute value of the change in audio delay time is greater than the threshold.

According to one embodiment of the method, the method further comprises determining, at the primary audio device, that the second audio device did not receive the second portion of audio, and adjusting the audio delay time to account for audio playback by only the primary audio device.

DETAILED DESCRIPTION OF EMBODIMENTS

Introduction

Figure 1:
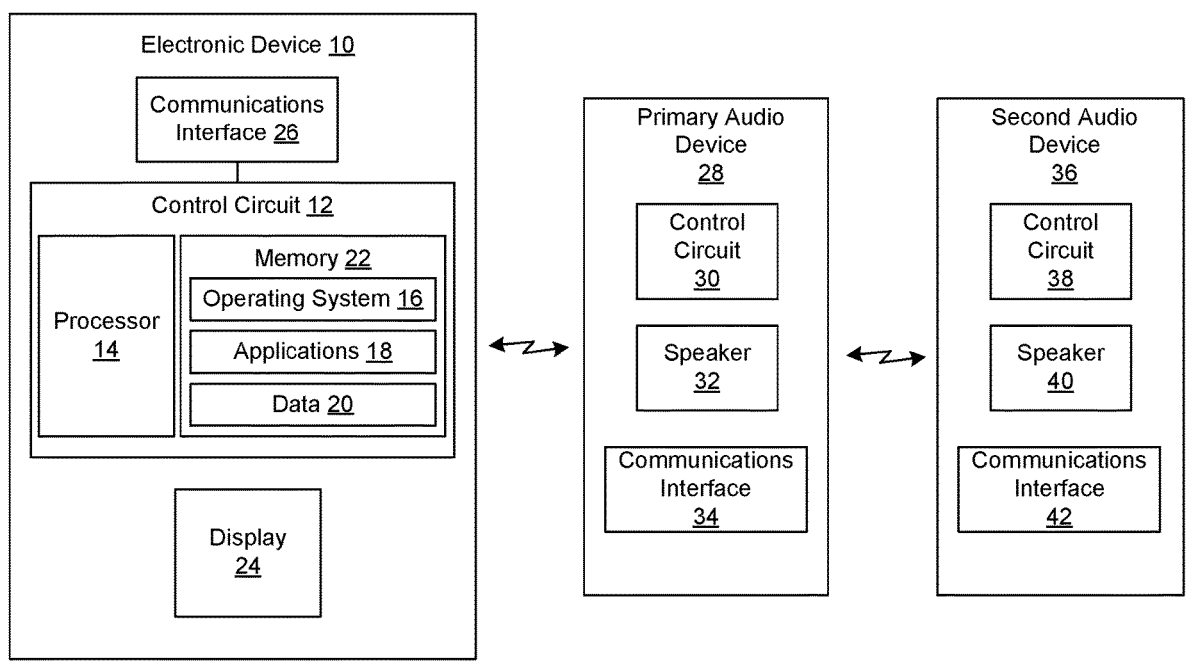
FIG. 1 is a schematic block diagram of a system including an electronic device, primary audio device, and second audio device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for compensating for an audio delay caused by communication between truly wireless audio devices.

System Architecture

FIG. 1 is a schematic diagram of an exemplary system for implementing the disclosed techniques. It will be appreciated that the illustrated system is representative and other systems may be used to implement the disclosed techniques.

The system includes an electronic device 10. The electronic device 10 may be any device capable of playing media (audio and video), and wirelessly communicating with an audio device. As such, the electronic device may be, but is not limited to, a mobile telephone (e.g. a "smartphone"), a user equipment or UE as contemplated under 3GPP standards, a tablet computing device, a computer, a device that uses machine-type communications, a media player, a gaming device or console, etc.

The electronic device 10 is configured to carry out associated logical functions that are described herein. Referring to the exemplary embodiment of an electronic device 10, the electronic device 10 includes a control circuit 12 that may be responsible for at least a portion of the overall operation of the electronic device 10. For example, in embodiments where the electronic device 10 carries out non-media related functions (e.g., as in the case of a smartphone), the control circuit 12 may carry out the non-media related functions of the electronic device 10. As another example, the control circuit 12 may carry out methods disclosed herein.

The control circuit 12 may include a processor 14 that executes code, such as an operating system 16 and various applications 18, to carry out various functions of the electronic device 10. Logical functions and/or hardware of the electronic device 10 may be implemented in other manners depending on the nature and configuration of the electronic device 10. Therefore, the illustrated and described approaches are just examples and other approaches may be used including, but not limited to, the control circuit 12 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.).

The operating system 16, the applications 18, and stored data 20 are stored on a memory 22. The stored data 20 may include, but is not limited to, data associated with the operating system 16, data associated with the applications 18, and user files such as digital media files, for example, audio, video, audio and video, etc.

The memory 22 may be, for example, one or more of a buffer, a flash memory, a hard drive, a removable media, a volatile memory, a non-volatile memory, a random access memory (RAM), or other suitable device. In a typical arrangement, the memory 22 includes a non-volatile (persistent) memory for long term data storage and a volatile memory that functions as system memory for the control circuit 12. The memory 22 is considered a non-transitory computer readable medium.

In one embodiment, the electronic device 10 includes a communications interface 26 (e.g., communications circuitry) that enables the electronic device 10 to establish various wireless communication connections. In the exemplary embodiment, the communications interface 26 includes a Bluetooth interface. Wired communications interfaces 26 also may be present. The communications interface 26 is operational to conduct communications with other devices over a communications medium 28 that may include one or more of a local device connected to the electronic device 10, a cellular radio network, a local area network (e.g., WiFi network), a Bluetooth network, the Internet, etc.

The electronic device 10 may include a variety of other components. For instance, the electronic device 10 may include a display 24 for displaying visual information to a user. The display 24 may be coupled to the control circuit 12 by a video circuit that converts video data to a video signal used to drive the display. The video circuit may include any appropriate buffers, decoders, video data processors, and so forth. The display 24 can be used to display video associated with media playback.

The electronic device 10 may include one or more user inputs (not shown) for receiving user input for controlling operation of the electronic device 10. Exemplary user inputs include, but are not limited to, a touch sensitive input that overlays or is part of the display for touch screen functionality, and one or more buttons. Other types of data inputs may be present, such as one or more motion sensors (e.g., gyro sensor(s), accelerometer(s), etc.).

The electronic device 10 may further include a sound circuit (not shown) for processing audio signals. Coupled to the sound circuit are a speaker and a microphone that enable audio operations that are carried out with the electronic device 10 (e.g., conduct telephone calls, output sound, capture audio, etc.). The sound circuit may include any appropriate buffers, encoders, decoders, amplifiers, and so forth.

The primary audio device 28 can include a control circuit 30. Control circuit 30 can include a processor that executes code, such as an operating system and various applications, to carry out various functions of the primary audio device 28. Logical functions and/or hardware of the primary audio device 28 may be implemented in other manners depending on the nature and configuration of the primary audio device 28. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.). The primary audio device 28 also includes a speaker 32 configured to output audio. Further, the primary audio device 28 can include a communications interface 34 that enables the primary audio device 28 to establish various wireless communication connections. In the exemplary embodiment, the communications interface 34 includes a Bluetooth interface that can communicate with the electronic device 10 and/or the second audio device 36.

The second audio device 36 can also include a control circuit 38. Control circuit 38 can include a processor that executes code, such as an operating system and various applications, to carry out various functions of the second audio device 36. Logical functions and/or hardware of the second audio device 36 may be implemented in other manners depending on the nature and configuration of the second audio device 36. Therefore, the illustrated and described approaches are just examples and other approaches may be used including, but not limited to, the control circuit 38 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.). The second audio device 36 also includes a speaker 40 configured to output audio. Further, the second audio device 36 can include a communications interface 42 that enables the second audio device 36 to establish various wireless communication connections. In the exemplary embodiment, the communications interface 42 includes a Bluetooth interface that can communicate with the electronic device 10 and/or the primary audio device 28.

Practical Application

Media systems in which a first audio device communicates wirelessly with a second audio device include a latency caused by the communication between the two audio devices. For example, a truly wireless audio device can comprise a first earpiece and a second earpiece. "Truly wireless" as described herein describes a system that includes at least two separate audio devices capable of wirelessly communicating audio data between each other. The electronic device that is playing a media file transmits audio data to the first earpiece. The first earpiece then transmits a portion of the audio data to the second earpiece. This communication between the first and second earpiece causes a latency that the system can account for in order to synchronize a video playback with the corresponding audio playback on the wireless headset. It should be appreciated that the systems and methods described herein can apply not only to audio devices having earpieces, but also to any type of media system having at least two audio devices that can communicate with each other.

Figure 2:
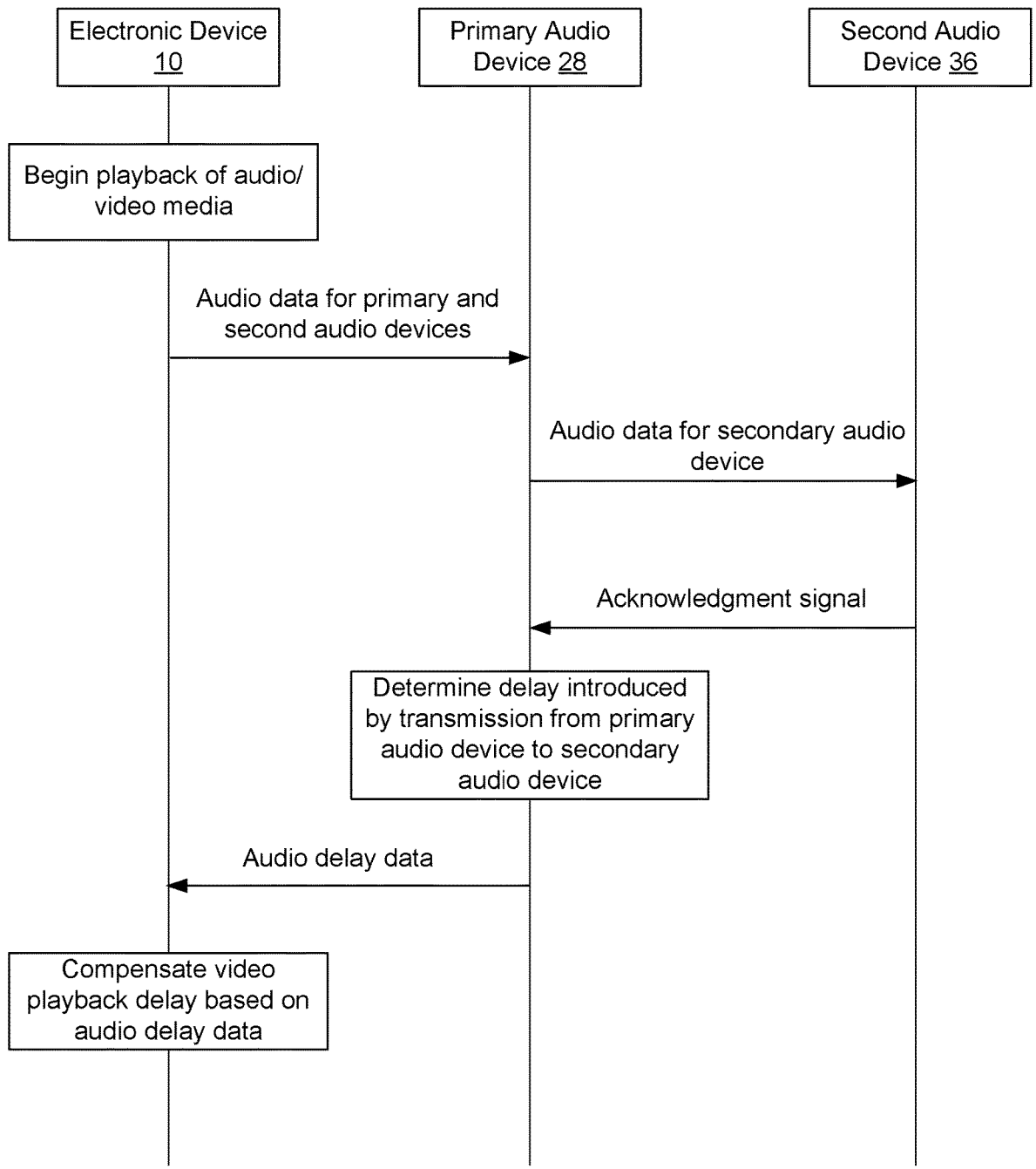
FIG. 2 is a communication diagram of a representative system used for determining audio delay data and compensating video playback delay based on the audio delay data.

A communications diagram showing an exemplary embodiment of a media system is displayed in FIG. 2. The electronic device 10 begins playback of audio and video (AV) media. The AV media can be a movie, a video clip, a video call, a videoconference, among others. The AV media can, for example, be stored in memory 22 of the electronic device 10, or it can be streamed over a communications network. When the electronic device 10 begins playback of the AV media, the electronic device 10 wirelessly sends audio data to a primary audio device 28. The audio data includes a first portion of audio data for playback with the primary audio device 28 and a second portion of audio data for playback with the second audio device 36. The electronic device 10 can communicate the audio data to the primary audio device 28 through a wireless protocol such as Bluetooth or WiFi. Once the primary audio device 28 wirelessly receives the audio data for both the primary 28 and second audio devices 36, the primary audio device 28 wirelessly relays the second portion of audio data to the second audio device 36. The primary audio device 28 can communicate wirelessly with the second audio device 36 using a wireless protocol such as Bluetooth or WiFi.

When the second audio device 36 receives the second portion of audio data from the primary audio device 28, the second audio device 36 sends an acknowledgment signal to the primary audio device 28. The primary audio device 28 receives this acknowledgment signal and determines the delay time caused by the communication of the second portion of audio data to the second audio device 36. In certain embodiments, the delay is determined by determining a time difference between the primary audio device 28 sending the second portion of audio and the primary audio device 28 receiving the acknowledgment signal, and dividing the time difference by two. In other embodiments, the primary audio device 28 can assume a pre-determined delay time. The pre-determined delay time can be chosen and implemented based on a typical latency caused by transmitting the second portion of audio from the primary audio device 28 to the second audio device 36. For example, the pre-determined delay time can be determined by experimentation, or by an averaging of latency over a period of time.

In some situations, the second audio device 36 may lose connection with the primary audio device 28. If the primary audio device 28 does not receive an acknowledgment signal from the second audio device 36, or the primary audio device 28 otherwise determines that it has lost connection with the second audio device 36, the primary audio device 28 can set the delay value to zero. A delay value of zero accounts for the fact that the audio data is only being played by the primary audio device 28 and that no delay is necessary to account for communications between the primary audio device 28 and the second audio device 36. Once communications are re-established between the primary audio device 28 and the second audio device 36, the primary audio device 28 can continue determining the delay created by communicating the second portion of audio data to the second audio device 36. Further, the primary audio device can continuously measure the delay so that it updates the delay value when it changes by more than a predetermined threshold value. This continuous monitoring can account for situations that increase or decrease the amount of time it takes for the second portion of audio data to reach the second audio device 36. These situations include a change in the environment (e.g. the user walks outside or into a different room), a change in media quality, or a change in codec.

After the primary audio device 28 determines the delay created by communicating the second portion of audio data to the second audio device 36, the primary audio device 28 wirelessly transmits the audio delay time to the electronic device 10. In certain embodiments where the primary audio device 28 wirelessly transmits the audio delay time to the electronic device 10 via Bluetooth, the audio delay time can be communicated via a Bluetooth profile such as Advanced Audio Distribution Profile (A2DP) or Audio/Video Remote Control Profile (AVRCP). The electronic device 10 receives the audio delay time and compensates video playback delay based on the audio delay time. For example, the electronic device can adjust the video playback by adding a video delay that corresponds to the audio delay time by adjusting the video clock.

Figure 3:
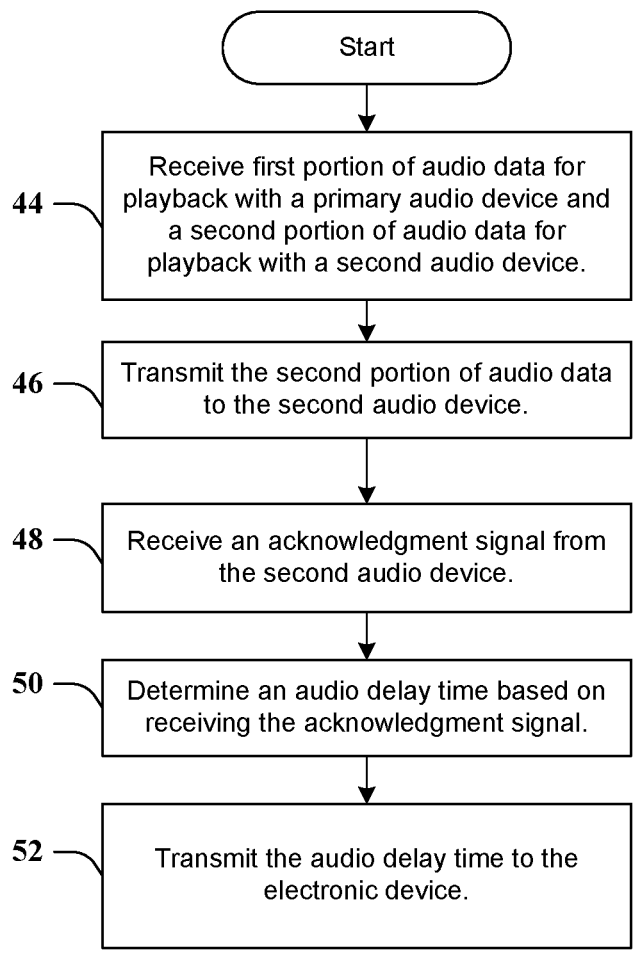
FIG. 3 is a flow diagram of a representative method performed by a primary audio device.

Turning now to FIG. 3, a method for determining and transmitting an audio delay time is displayed. This method can be performed by the primary audio device 28. At block 44, the primary audio device 28 receives, from an electronic device 10, a first portion of audio data for playback with a primary audio device 28 and a second portion of audio data for playback with a second audio device 36. At block 46, the primary audio device 28 transmits the second portion of audio data to the second audio device 36. At block 48, the primary audio device 28 receives an acknowledgment signal from the second audio device 36, the acknowledgment signal acknowledges receipt of the second portion of audio data at the second audio device 36. At block 50, the primary audio device 28 determines an audio delay time based on receiving the acknowledgment signal. At block 52, the primary audio device 28 wirelessly transmits the audio delay time to the electronic device. For example, the primary audio device 28 can wirelessly transmit the audio delay time to the electronic device 10 through Bluetooth communications using a Bluetooth profile such as A2DP or AVRCP. In certain embodiments, the primary audio device 28 transmits the audio delay time to the electronic device 10 at a regular time interval. In other embodiments, the primary audio device 28 can transmit the audio delay time to the electronic device based on a comparison of the change in audio delay time to a predetermined threshold, as described below with respect to FIG. 4.

Figure 4:
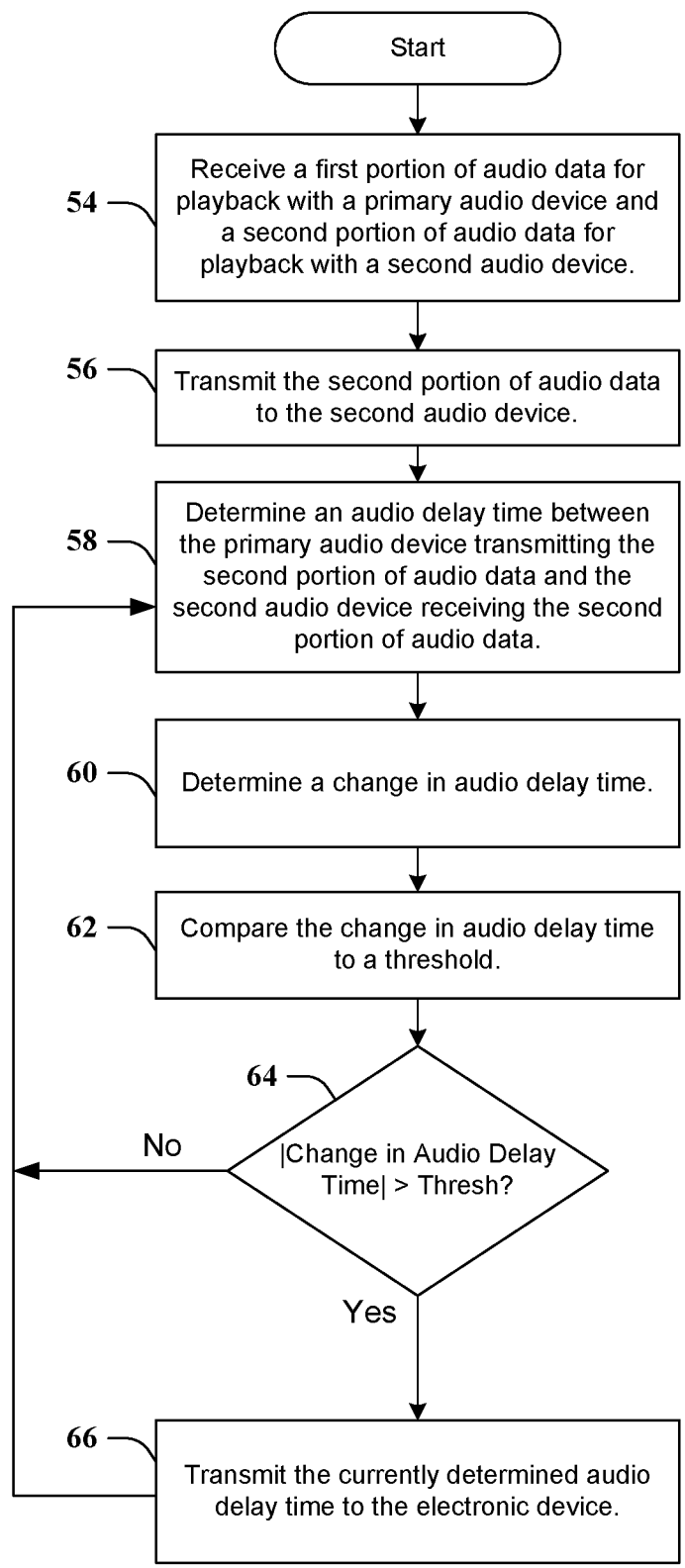
FIG. 4 is a flow diagram of a representative method performed by a primary audio device.

Turning now to FIG. 4, a method for determining and transmitting an audio delay time is displayed. This method can be performed by the primary audio device 28. At block 54, the primary audio device 28 receives, from an electronic device 10, a first portion of audio data for playback with a primary audio device 28 and a second portion of audio data for playback with a second audio device 36. At block 56, the primary audio device 28 transmits the second portion of audio data to the second audio device 36. At block 58, the primary audio device 28 determines an audio delay time between the primary audio device transmitting the second portion of audio data and the second audio device receiving the second portion of audio data. At block 60, the primary audio device 28 determines a change in audio delay time between the currently determined audio delay time and a previous audio delay time. At block 62, the primary audio device 28 compares the change in audio delay time to a threshold. At block 64, the primary audio device 28 determines whether the absolute value of the change in audio delay time is greater than the threshold. If the absolute value of the change in audio delay time is not greater than the threshold, the primary audio device 28 continues to monitor the audio delay time, determine the change in audio delay time between the current audio delay time and a previous audio delay time, and compare the change in audio delay time to the threshold. If the absolute value of the change in audio delay time is greater than the threshold, the primary audio device 28 transmits the currently determined audio delay time to the electronic device 10 at block 66.

It should be appreciated that in certain embodiments, the steps shown at blocks 60, 62, and 64 can be performed by the electronic device 10. In these embodiments, the primary audio device 28 transmits the audio delay time to the electronic device 10 after determining the audio delay time between the primary audio device 28 transmitting the second portion of audio data and the second audio device 36 receiving the second portion of audio data. After receiving the audio delay time from the primary audio device 28, the electronic device 10 can perform the steps of determining a change in audio delay time between the currently determined audio delay time and a previous audio delay time, comparing the change in audio delay time to a threshold, and determining whether the absolute value of the change in audio delay time is greater than the threshold. If the change in audio delay time is not greater than the threshold, the electronic device 10 does not adjust the video playback, but continues determining the change in audio delay time and comparing the change in audio delay time to the threshold. If the change in audio delay time is greater than the threshold, the electronic device 10 adjusts the video playback based on the audio delay time such that the video playback is synchronized with the audio playback in the first audio device 28 and the second audio device 36.

In certain embodiments, if the audio delay time has decreased since the previous audio delay time and the absolute value of the change in audio delay time is greater than the threshold, the electronic device 10 would decrease the delay for video playback. Similarly, if the audio delay time has increased since the previous audio delay time and the absolute value of the change in audio delay time is greater than the threshold, the electronic device 10 would increase the delay for video playback. The electronic device 10 can utilize a smoothing function to smoothly compensate the video playback delay according to the audio delay time. For example, by interpolating the active video delay to the target video delay defined by the audio delay time, the electronic device 10 can compensate smoothly, and provide synchronization adjustments gradually as to avoid detection by a user.

Figure 5:
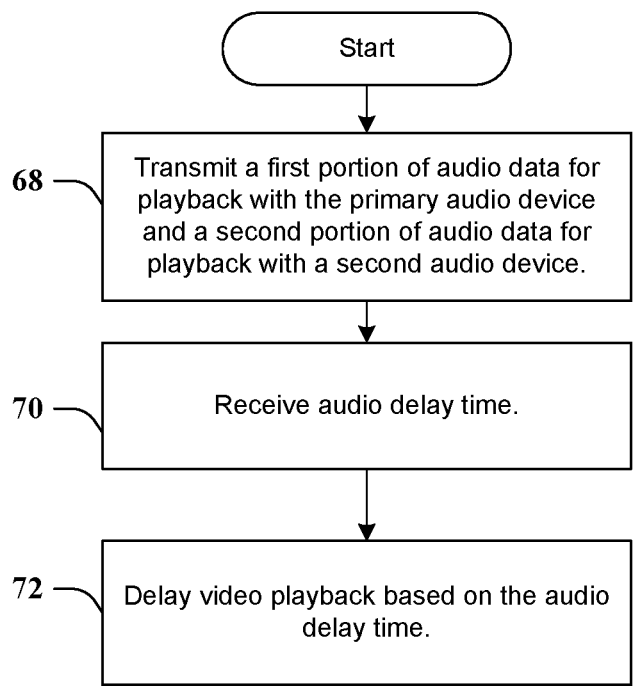
FIG. 5 is a flow diagram of a representative method performed by an electronic device.

Turning now to FIG. 5, a method for synchronizing audio-video playback is displayed. At block 68, the electronic device 10 wirelessly transmits, to a primary audio device, a first portion of audio data for playback with the primary audio device 28 and a second portion of audio data for playback with a second audio device 36. At block 70, the electronic device 10 receives, from the primary audio device, an audio delay time that accounts for a latency caused by the primary audio device transmitting the second portion of audio data to the second audio device 36. At block 72, the electronic device 10 delays video playback based on the audio delay time.

CONCLUSION

Although certain embodiments have been shown and described, it is understood that equivalents and modifications falling within the scope of the appended claims will occur to others who are skilled in the art upon the reading and understanding of this specification.

What is claimed is:

1. A system for synchronizing audio-video playback, comprising:
   an electronic device; and
   a primary audio device configured to:
     wirelessly receive, from the electronic device, a first portion of audio data for playback with the primary audio device, and a second portion of audio data for playback with a second audio device;
     wirelessly transmit the second portion of audio data to the second audio device;
     wirelessly receive an acknowledgment signal from the second audio device, the acknowledgment signal acknowledges receipt of the second portion of audio data at the second audio device;
     determine an audio delay time based on receipt of the acknowledgment signal;
     determine a change in audio delay time between the audio delay time and a previous audio delay time;
     compare the change in audio delay time to a threshold; and
     wirelessly transmit the audio delay time to the electronic device based on a determination that the absolute value of the change in audio delay time is greater than the threshold, the audio delay time accounts for a latency caused by wirelessly transmitting the second portion of audio data from the primary audio device to the second audio device;
   wherein the electronic device is configured to delay a video playback based on the audio delay time.

2. The system of claim 1, wherein the primary audio device uses Bluetooth communication to receive the first portion of audio data and the second portion of audio data from the electronic device, and to transmit the audio delay time to the electronic device.

3. The system of claim 2, wherein the primary audio device utilizes an Advanced Audio Distribution Profile (A2DP) or an Audio/Video Remote Control Profile (AVRCP) to transmit the audio delay time to the electronic device.

4. A method for determining and transmitting an audio delay time, comprising:
   wirelessly receiving, from an electronic device, a first portion of audio data for playback with a primary audio device, and a second portion of audio data for playback with a second audio device;
   wirelessly transmitting the second portion of audio data to the second audio device;
   wirelessly receiving an acknowledgment signal from the second audio device, the acknowledgment signal acknowledges receipt of the second portion of audio data at the second audio device;
   determining the audio delay time based on receipt of the acknowledgment signal;

determining a change in audio delay time between the audio delay time and a previous audio delay time;

comparing the change in audio delay time to a threshold; and wirelessly transmitting the audio delay time to the electronic device based on a determination that the absolute value of the change in audio delay time is greater than the threshold, wherein the audio delay time accounts for a latency caused by wirelessly transmitting the second portion of audio data to the second audio device.

5. The method of claim 4, further comprising:

determining that the second audio device did not receive the second portion of audio; and adjusting the audio delay time to account for audio playback by only the primary audio device.

6. The method of claim 4, wherein Bluetooth communication is used for wirelessly receiving the first portion of audio data and the second portion of audio data, and for wirelessly transmitting the audio delay time to the electronic device.

7. The method of claim 6, wherein the primary audio device utilizes an Advanced Audio Distribution Profile (A2DP) or an Audio/Video Remote Control Profile (AVRCP) to transmit the audio delay time to the electronic device.

8. The method of claim 4, wherein determining the audio time delay comprises determining a time difference between transmitting the second portion of audio and receiving the acknowledgment signal from the second audio device, and dividing the time difference by two.

9. A primary audio device comprising a communications interface and a control circuit configured to carry out the method of claim 4.

10. A method for synchronizing audio-video playback using a system comprising an electronic device and a primary audio device, the method comprising:

wirelessly receiving, at the primary audio device, a first portion of audio data for playback with the primary audio device, and a second portion of audio data for playback with a second audio device;

wirelessly transmitting the second portion of audio data from the primary audio device to the second audio device;

wirelessly receiving an acknowledgment signal from the second audio device, the acknowledgment signal acknowledges receipt of the second portion of audio data at the second audio device;

determining an audio delay time based on receipt of the acknowledgment signal;

determining a change in audio delay time between the audio delay time and a previous audio delay time;

comparing the change in audio delay time to a threshold;

wirelessly transmitting the audio delay time from the primary audio device to the electronic device based on a determination that the absolute value of the change in audio delay time is greater than the threshold, the audio delay time accounts for a latency caused by wirelessly transmitting the second portion of audio data from the primary audio device to the second audio device; and delaying a video playback at the electronic device, based on the audio delay time.

11. The method of claim 10, wherein the steps of wirelessly receiving the first portion of audio data and the second portion of audio data from the electronic device, and transmitting the audio delay time to the electronic device are performed using Bluetooth communication.

12. The method of claim 11, wherein the step of wirelessly transmitting the audio delay time to the electronic device utilizes an Advanced Audio Distribution Profile (A2DP) or an Audio/Video Remote Control Profile (AVRCP).

13. The method of claim 10, further comprising:

determining, at the primary audio device, that the second audio device did not receive the second portion of audio; and adjusting the audio delay time to account for audio playback by only the primary audio device.

\* \* \* \* \*